United States Patent
Couch

(10) Patent No.: US 10,815,736 B2
(45) Date of Patent: Oct. 27, 2020

(54) UNDERWATER SCR LIFTING FRAME

(71) Applicant: Oceaneering International, Inc., Houston, TX (US)

(72) Inventor: Walter Jack Couch, Patterson, LA (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/389,179

(22) Filed: Apr. 19, 2019

(65) Prior Publication Data

US 2019/0323297 A1    Oct. 24, 2019

Related U.S. Application Data

(60) Provisional application No. 62/660,375, filed on Apr. 20, 2018.

(51) Int. Cl.
| | |
|---|---|
| *E21B 17/01* | (2006.01) |
| *F16L 1/15* | (2006.01) |
| *E21B 43/01* | (2006.01) |
| *E21B 19/00* | (2006.01) |

(52) U.S. Cl.
CPC .............. *E21B 17/01* (2013.01); *E21B 43/01* (2013.01); *F16L 1/15* (2013.01); *E21B 19/004* (2013.01)

(58) Field of Classification Search
CPC ...... E21B 19/004; E21B 17/015; E21B 17/01; E21B 17/085; E21B 43/01; F16L 1/15
See application file for complete search history.

(56) References Cited

U.S. PATENT DOCUMENTS

| | | | | |
|---|---|---|---|---|
| 3,599,436 | A  * | 8/1971 | Lochridge | B23K 9/0061 405/169 |
| 5,269,629 | A  * | 12/1993 | Langner | F16L 27/103 166/367 |
| 2012/0207547 | A1 * | 8/2012 | Guzick | E21B 17/012 405/166 |
| 2012/0227976 | A1 * | 9/2012 | Barone | E21B 19/006 166/355 |
| 2016/0229493 | A1 * | 8/2016 | DaSilva | B63B 21/20 |
| 2017/0159377 | A1 * | 6/2017 | Salem | E21B 17/085 |

* cited by examiner

*Primary Examiner* — Carib A Oquendo

(74) *Attorney, Agent, or Firm* — Maze IP Law, P.C.

(57) ABSTRACT

An underwater steel catenary pipeline riser (SCR) lifting frame comprises a lift frame foundation and an SCR lifting frame comprising a lift frame interface adapted to be connected to the lift frame foundation; a foundation interface; a lift guide configured to accept the lift frame foundation; and a lift slidably disposed about the lift guide, the lift comprising an SCR pull head interface configured to be connected to an SCR pull head. The underwater steel catenary pipeline riser (SCR) lifting frame and systems using it allow for flex joint repair/replacement subsea which do not require large winches, deck re-enforcements, steering winches, and heavy crane lifts required by facility mounted winches above water and also reduces required heavy lifting and overall complexity of flex joint replacement.

16 Claims, 4 Drawing Sheets

UNDERWATER SCR LIFTING FRAME

RELATION TO OTHER APPLICATIONS

This application claims priority through U.S. Provisional Application 62/660,375 filed on 20 Apr. 2018.

BACKGROUND

Deepwater facilities may have steel catenary pipeline risers (SCR) with flex joints. In such environments, cost of repair may be affected by the depth of water and size of the SCR to be lifted. Typically, deepwater facilities have a flexible joint flex joint or titanium stress joint (TSJ) built in to the SCR's to dampen the movement of the facility to the SCR. Over time the moving and flexing causes the flex joints to deteriorated and require replacement or TSJ's removal for inspection and testing.

Current technology requires locating large winches on board the facility that both lift and steer the flex joint above water, where it can be removed and replaced. In the past, systems have re-enforced the upper decks, placed temporary cranes, and used large lift winches, rolling blocks, and steering winches.

FIGURES

Various figures are included herein which illustrate aspects of embodiments of the disclosed inventions.

DESCRIPTION OF EXEMPLARY EMBODIMENTS

In embodiments, the claimed invention does not require the large winches, deck re-enforcements, steering winches, and heavy crane lifts required by the facility mounted winches above water and reduces the required heavy lifting and overall complexity of flex joint replacement by eliminating the engineering and upper deck re-enforcements needed for the large topside winches, further simplifying the overall flex joint change out by directly up, avoiding heavy lift equipment and steering winches.

Figure 1:
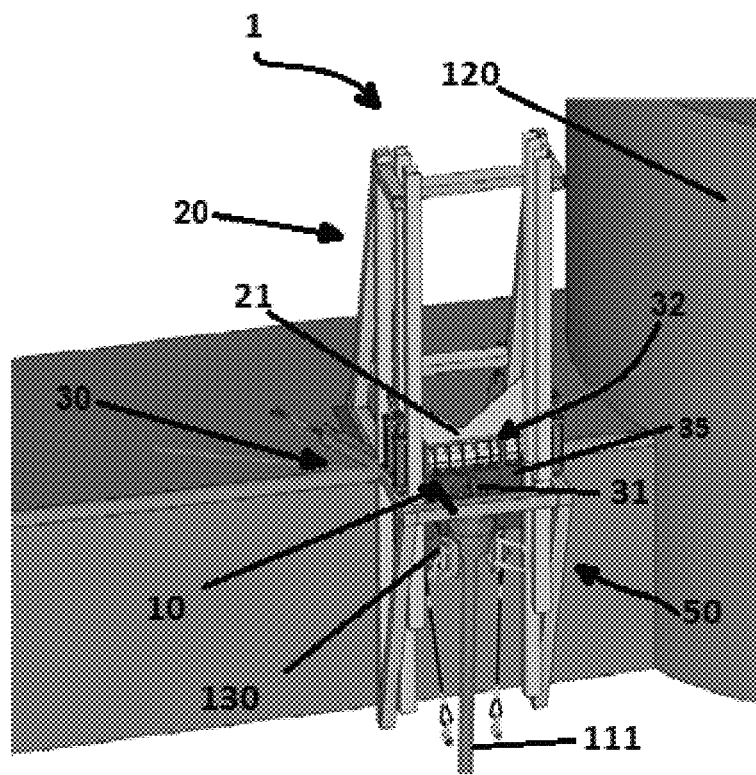
FIG. 1 is a view in partial perspective of an exemplary underwater steel catenary pipeline riser (SCR) lifting frame.
Figure 2:
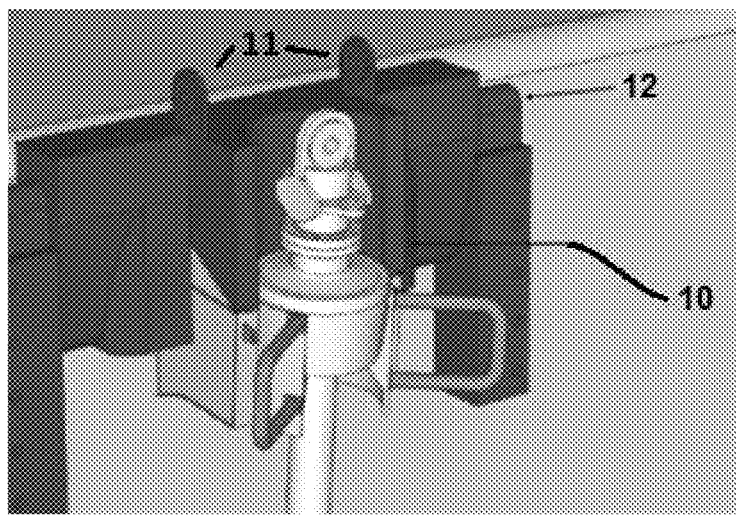
FIG. 2 is a view in partial perspective of a close-up of an exemplary SCR receptacle, lift frame foundation, and lift connectors.
Figure 3:
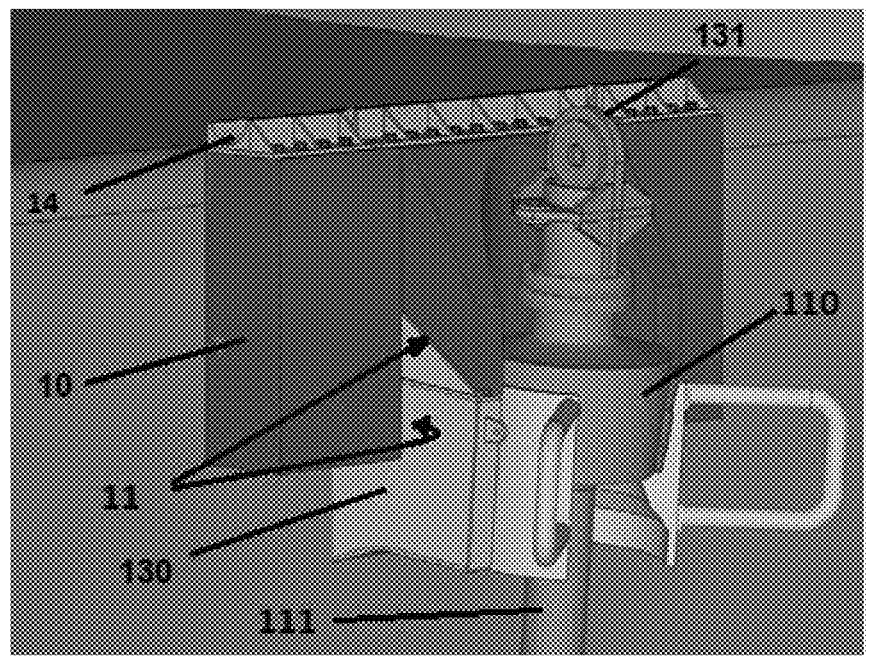
FIG. 3 is a further view in partial perspective of a close-up of an exemplary SCR receptacle, lift frame foundation, and lift connectors.
Figure 4:
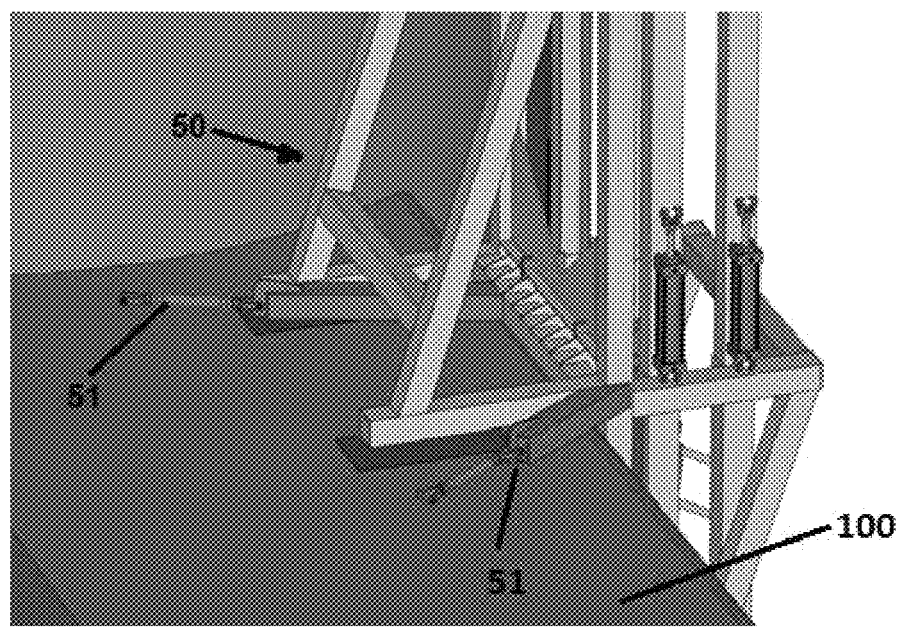
FIG. 4 is a view in partial perspective of a close-up of an exemplary foundation interface.

In a first embodiment, referring generally to FIG. 1, underwater steel catenary pipeline riser (SCR) lifting frame 1 comprises lift frame foundation 10 (FIG. 2), comprising one or more SCR mating surfaces 11 (FIG. 2) configured to be connected to SCR receptacle 130, and SCR lifting frame 20, comprising lift frame interface 21 adapted to be connected to lift frame foundation 10 at lift connectors 14 (FIG. 2); foundation interface 50; lift guide 30 configured to accept the lift frame foundation; and lift 32 slidably disposed about lift guide 30, lift 32 comprising an SCR pull head interface 31 configured to be connected to an SCR pull head 131 (FIG. 3).

Lift 32, which may comprise one or more lifting beams 35, is typically removably disposed with respect to lift guide 30 and may further be slidably disposed within a predetermined portion of the lift guide 30.

SCR pull head interface 31 may comprise a coupler such as a shackle configured to be connected to SCR pull head 131.

Referring additionally to FIG. 2, in embodiments, lift frame foundation 10 further comprises one or more alignment guides 12 configured to aid alignment of lift frame foundation 10 with SCR lifting frame 20. Lift frame foundation 10 may further comprise a base retainer system adapted to secure lift frame foundation 10 to SCR lifting frame 20.

Figure 5:
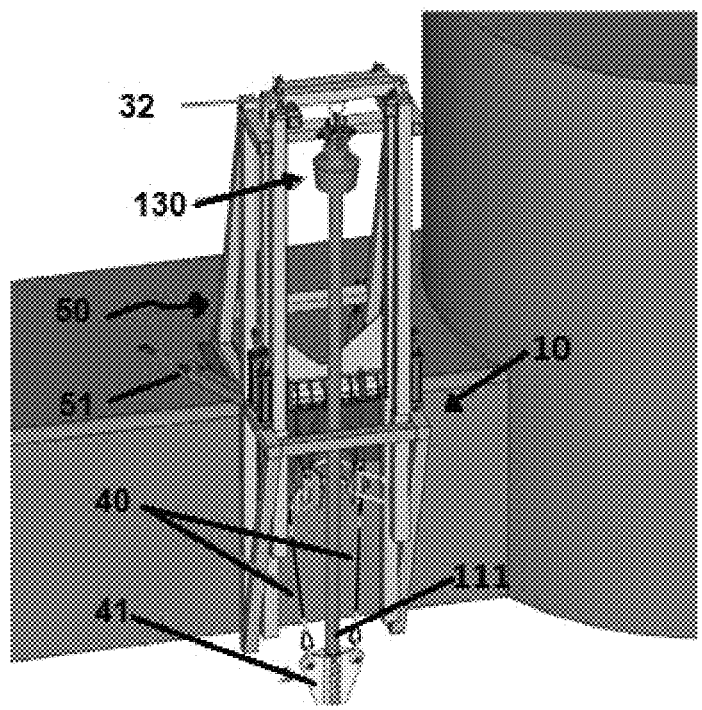
FIG. 5 is a further view in partial perspective of an exemplary underwater steel catenary pipeline riser (SCR) lifting frame with slings.

Referring additionally to FIG. 5, in certain embodiments underwater SCR lifting frame 1 comprises a predetermined set of lifting frame securing fasteners 51 connected to frame interface 50 and configured to secure the lifting frame 20 (FIG. 1) to subsea structure 120 (FIG. 1).

In embodiments, a predetermined set of slings 40 are present and connected to lift frame foundation 10 and/or foundation interface 50 where one or more friction clamps 41 is connected to the predetermined set of slings 40. Slings 40 are typically connected to lift frame foundation 10 and friction clamp 41 is typically connected to sling 40 and configured to secure underwater steel catenary pipeline riser 111.

Figure 6:
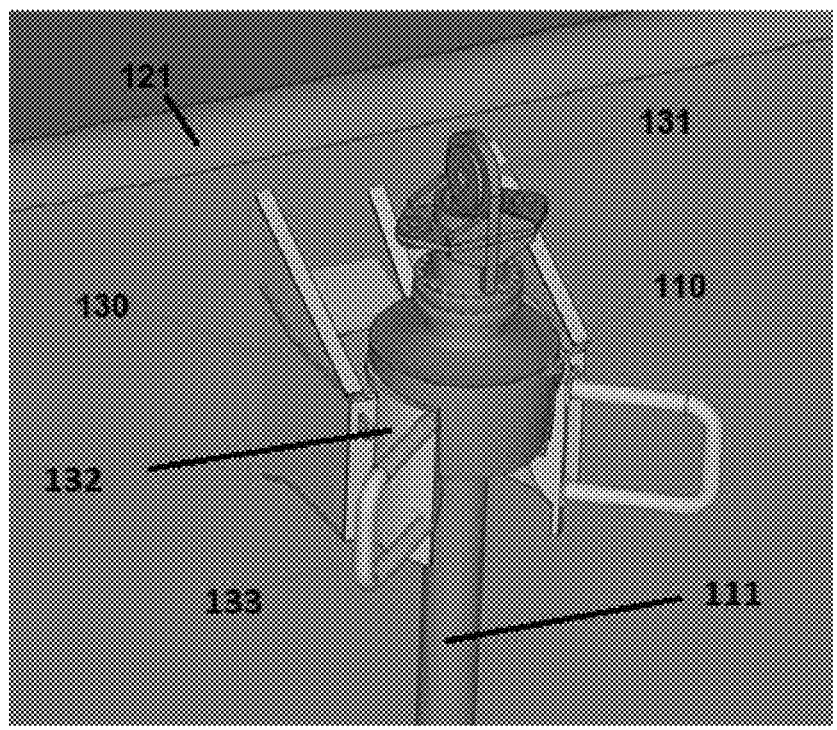
FIG. 6 is a further view in partial perspective of an exemplary SCR receptacle.

Referring additionally to FIG. 6, typically, pipe grip 132 is present and configured to be inserted into or otherwise be a part of SCR receptacle 130 and configured to secure pipe 111 within SCR receptacle 130. One or more SCR receptacle guides 133 may also be present, as will be familiar to one or ordinary skill in this art. Lift frame foundation 10 (FIG. 3) may be customized to fit onto or into SCR receptacle 130.

Figure 7:
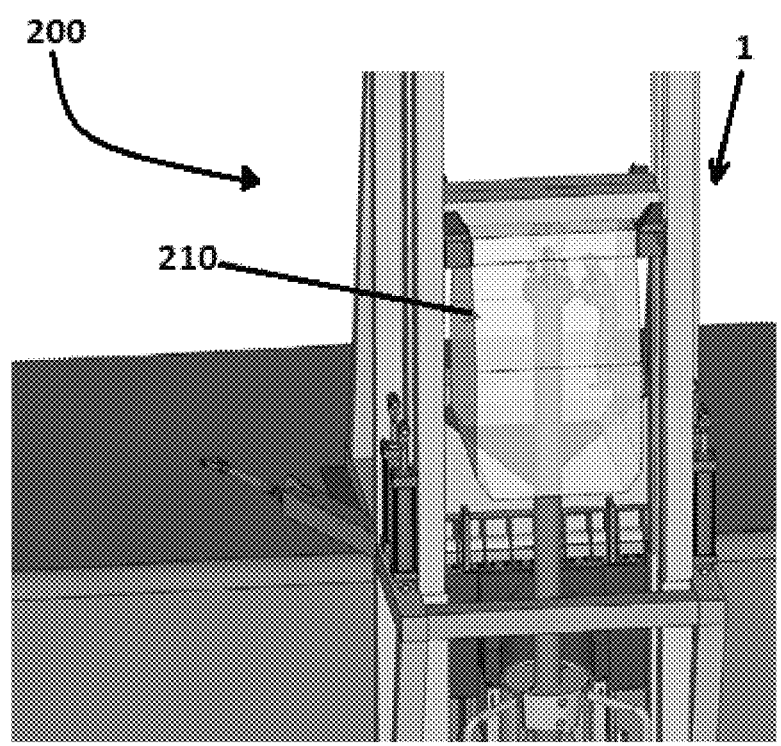
FIG. 7 is a view in partial perspective of an exemplary system comprising an underwater steel catenary pipeline riser (SCR) lifting frame with an underwater dry welding habitat.

Referring now to FIG. 7, system 200 may be used for replacement of flex joint 110 and comprises underwater SCR lifting frame 1 described above as well as underwater dry welding habitat 210 configured to be deployed at least partially within SCR lifting frame 20.

In the operation of exemplary methods, in embodiments the claimed invention may be used to change existing processes by installing underwater SCR lifting frame 1 such that it will just lift flex joint 110 (FIG. 3) high enough to be cut for removal. System 200 (FIG. 7) may be used with its underwater SCR lifting frame 1 and its underwater dry welding habitat 210 to allow welding of a new flex joint assembly onto pipe 111. Performing a local limited lift may then remove the need for large lift winches and performing a straight vertical lift with underwater SCR lifting frame 1 can be used to eliminate the steering winches normally required to counter the angle of the main lift winch.

Referring back to FIG. 1, replacement of flexible joint 110 (FIG. 3) built into an underwater steel catenary pipeline riser (SCR) of pipeline riser 111 may be accomplished using underwater SCR lifting frame 1 or system 200 described above. Underwater SCR lifting frame 1 is typically secured to a subsea structure such as deepwater facility 120 and lift frame foundation 10 connected to an existing SCR receptacle 130. Riser 111 is secured into existing SCR receptacle 130 and, typically, a closure spool is removed. Generally, after the closure spool is removed, SCR pull head 131 (FIG.

3) is installed into flex joint 110 (FIG. 3) of riser 111 (FIG. 3) where flex joint 110 is to be replaced subsea. Lift 32 is positioned to a location proximate SCR pull head 131 and secured to SCR pull head 131 such as with SCR pull head interface 31 configured to be connected to SCR pull head 131. Once secured, lift 32 is moved with respect to lifting frame foundation 10 to secure flex joint 110 at a distance removed from existing SCR receptacle 130. Generally, once so secured, a tubular to which flex joint 110 is connected, e.g. riser 111, is severed at a distance intermediate flex joint 110 and existing SCR receptacle 130 and a new flex joint 110 secured onto a section of the tubular. The secured, new flex joint 110 is then connected to the tubular from which the existing flex joint 110 was severed and positioned into the existing SCR receptacle 130.

Referring additionally to FIG. 7, in certain embodiments, underwater dry welding habitat 210, which is configured to be deployed at least partially within a predetermined portion of underwater SCR lifting frame 1 such as within lifting frame 20, is secured such that a lifted flex joint 110 is within underwater dry welding habitat 210 and one or more welding operations performed within underwater dry welding habitat 210. These can include welding a flange to the new flex joint 100 or welding flex joint 100 to SCR receptacle 130.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. An underwater steel catenary pipeline riser (SCR) lifting frame, comprising:
   a. a lift frame foundation disposed subsea, comprising an SCR mating surface configured to be connected to an SCR receptacle; and
   b. an SCR lifting frame disposed subsea, comprising:
      i. a lift frame interface adapted to be connected to the lift frame foundation;
      ii. a foundation interface dimensioned to secure the SCR lifting frame to a subsea structure;
      iii. a lift guide configured to accept the lift frame foundation; and
      iv. a lift slidably disposed about the lift guide, the lift comprising an SCR pull head interface configured to be connected to an SCR pull head.

2. The underwater SCR lifting frame of claim 1, further comprising a predetermined set of lifting frame securing fasteners connected to the frame interface and configured to secure the SCR lifting frame to a subsea structure.

3. The underwater SCR lifting frame of claim 1, further comprising:
   a. a predetermined set of slings connected to the foundation interface; and
   b. a clamp connected to the predetermined set of slings.

4. The underwater SCR lifting frame of claim 1, further comprising a pipe grip configured to be connected to the SCR receptacle, the pipe grip configured to secure a pipe within the SCR receptacle.

5. The underwater SCR lifting frame of claim 1, wherein the lift is removably disposed with respect to the lift guide.

6. The underwater SCR lifting frame of claim 1, wherein the lift which is slidably disposed about the lift guide the lift is slidably disposed within a predetermined portion of the lift guide.

7. The underwater SCR lifting frame of claim 1, wherein the lift frame foundation is customized to cooperatively fit with the SCR receptacle.

8. The underwater SCR lifting frame of claim 1, wherein the lift frame foundation further comprises an alignment guide configured to aid alignment of the lift frame foundation with the SCR lifting frame.

9. The underwater SCR lifting frame of claim 1, wherein the lift frame foundation further comprises a base retainer system adapted to secure the lift frame foundation to the SCR lifting frame.

10. The underwater SCR lifting frame of claim 1, wherein the lift comprises a lifting beam (35).

11. The underwater SCR lifting frame of claim 1, wherein the SCR pull head interface comprises a shackle configured to be connected to the SCR pull head.

12. A system for replacement of a flexible joint built into an underwater steel catenary pipeline riser (SCR) of a pipeline riser, comprising:
   a. an underwater steel catenary pipeline riser (SCR) lifting frame disposed subsea, comprising:
      i. a lift frame foundation disposed subsea, comprising an SCR mating surface configured to be connected to an SCR receptacle; and
      ii. an SCR lifting frame disposed subsea, comprising:
         1. a lift frame interface adapted to be connected to the lift frame foundation;
         2. a foundation interface dimensioned to secure the SCR lifting frame to a subsea structure;
         3. a lift guide configured to accept the lift frame foundation; and
         4. a lift slidably disposed about the lift guide, the lift comprising an SCR pull head interface configured to be connected to an SCR pull head; and
   b. an underwater dry welding habitat configured to be deployed at least partially within the SCR lifting frame, the underwater dry welding habitat further adapted to allow welding subsea.

13. The system for replacement of a flexible joint built into an underwater steel catenary pipeline riser (SCR) of pipeline riser of claim 12, wherein the underwater dry welding habitat is further configured to allow welding within the underwater dry welding habitat while deployed subsea.

14. A method of replacement of a flexible joint built into an underwater steel catenary pipeline riser (SCR) of pipeline riser using a system for replacement of a flexible joint built into an underwater steel catenary pipeline riser (SCR) of a pipeline riser comprising an underwater steel catenary pipeline riser (SCR) lifting frame disposed subsea which comprises a lift frame foundation disposed subsea comprising an SCR mating surface configured to be connected to an SCR receptacle and an SCR lifting frame disposed subsea comprising a lift frame interface adapted to be connected to the lift frame foundation, a foundation interface dimensioned to secure the SCR lifting frame to a subsea structure, a lift guide configured to accept the lift frame foundation, and a lift slidably disposed about the lift guide where the lift comprises an SCR pull head interface configured to be connected to an SCR pull head, the method comprising:
   a. securing the underwater SCR lifting frame to a subsea structure subsea;
   b. connecting the lift frame foundation to an existing SCR receptacle;
   c. securing a riser into the existing SCR receptacle;
   d. removing a closure spool and installing an SCR pull head into a flex joint of the riser, the flex joint to be replaced subsea;

e. positioning the lift to a location proximate the pull head;
f. securing the lift to the pull head;
g. moving the lift with respect to the lifting frame to secure the flexible joint at a distance removed from the existing SCR receptacle;
h. severing a tubular to which the flexible joint is connected at a distance intermediate the flexible joint and the existing SCR receptacle;
i. installing a new flexible joint onto a section of a tubular;
j. connecting the new flexible joint to the tubular from which the existing flexible joint was severed; and
k. positioning the new flexible joint into the existing SCR receptacle.

15. The method of claim 14, wherein the system further comprises an underwater dry welding habitat configured to be deployed at least partially within the SCR lifting frame, the method further comprising:
a. securing the underwater dry welding habitat configured to be deployed at least partially within the SCR lifting frame; and
b. performing a welding operation within the underwater dry welding habitat.

16. The method of claim 15, wherein the welding operation comprises welding a flange to a new flex joint or welding the flex joint to the SCR receptacle.

* * * * *